United States Patent [19]

Michel

[11] Patent Number: 4,889,663

[45] Date of Patent: Dec. 26, 1989

[54] METHOD OF MANUFACTURING URANIUM OXIDE BASE NUCLEAR FUEL PELLETS

[75] Inventor: Pirsoul Michel, Turnout, Belgium

[73] Assignee: Société Uranium Pechiney, Framatome & Cogema, & Cie, Courbevoie, France

[21] Appl. No.: 60,292

[22] Filed: Jun. 10, 1987

[30] Foreign Application Priority Data

Jun. 10, 1986 [FR] France ................... 86 08380

[51] Int. Cl.$^4$ ............... G21G 4/00; C01G 43/025; G21C 21/00
[52] U.S. Cl. ................... 264/0.5; 252/643; 423/261
[58] Field of Search .............. 264/0.5; 252/643; 423/261

[56] References Cited

U.S. PATENT DOCUMENTS

| | | | |
|---|---|---|---|
| 3,094,377 | 6/1963 | Langrod | 423/261 |
| 4,348,339 | 9/1982 | Assmann et al. | 264/0.5 |
| 4,389,355 | 6/1983 | Thornton et al. | 264/0.5 |
| 4,397,824 | 8/1983 | Butler | 423/260 |
| 4,578,229 | 3/1986 | Assmann et al. | 264/0.5 |

FOREIGN PATENT DOCUMENTS

| | | |
|---|---|---|
| 3445411 | 6/1985 | Fed. Rep. of Germany . |
| 2001113 | 9/1969 | France . |
| 2060242 | 6/1971 | France . |
| 2561026 | 9/1985 | France . |

*Primary Examiner*—Brooks H. Hunt
*Assistant Examiner*—Virginia B. Caress
*Attorney, Agent, or Firm*—Pollock, Vande Sande & Priddy

[57] ABSTRACT

For manufacturing uranium oxide based nuclear fuel pellets, a fine and reactive $U_3O_8$ powder is mixed with a fine $UO_2$ powder obtained by dry conversion. The $U_3O_8$ is obtained by oxidation in air of $UO_2$ obtained by a dry process, at a temperature less than 800° C.

6 Claims, No Drawings

METHOD OF MANUFACTURING URANIUM OXIDE BASE NUCLEAR FUEL PELLETS

BACKGROUND OF THE INVENTION

1. Technical Field

The invention relates to methods of manufacturing uranium oxide base pellets for use as nuclear fuel and more particularly to manufacture of "green" pellets by cold compression of a powder whose major component is uranium dioxide.

The invention makes use of uranium dioxide powder obtained by a dry process (i.e., by direct reduction of $UF_6$ into dioxide). The powders obtained by the dry conversion process, described in French No. 2,060,242 and U.S. Pat. No. 4,397,824, including water vapor hydrolysis followed by pyrohydrolysis of the uranyl fluoride $UO_2F_2$ obtained, have the advantage of being readily sinterable. On the other hand, the green pellets obtained by compression are relatively fragile. Handling thereof is delicate; the rejects are numerous if special care is not exercised.

2. Prior Art

Different methods have been proposed for reducing the fragility of green pellets. Attempts have been made to increase the density in green condition by increasing the compacting pressure, which has the drawback of causing premature wear of the compression dies. It has been proposed to add a binder and to granulate the powder and/or to subject the powder to different treatments (French 2,561,026). All of these solutions have drawbacks. Those which use water or a binder raise criticality problems. The methods are generally applicable only to small batches, practically not exceeding 50 kg.

The fragility of the green pellets obtained by compression of $UO_2$ powder obtained by dry conversion may probably be attributed to the fact that the powder is formed of fine crystallites more or less rounded, with a very low oxygen over-stoechiometry (ratio O/U of from 2.02 to 2.06). Reoxidation of the powder improves the strength of the pellets. Surface oxidization of the uranium oxide $UO_2$ redivides the grains into jagged aggregates with intertwining ramifications. The powder then has properties comparable to those of a powder obtained by a wet process: during compression of the pellets into shape, the grains engage each other and provide coherence.

But limited surface oxidization to $UO_2$ powder is difficult to achieve industrially. Oxidation tends to bolt until the whole of the oxide has oxidized to $U_3O_8$ which is difficult to sinter into pellets free of cracks, unless a slow controlled reduction step is added to the manufacture during presintering.

Moreover, oxidation generates islets of $U_3O_8$ which, during sintering, shrink more than the $UO_2$ grains, whence a heterogeneous texture. It is moreover practically impossible to carry out oxidation in a reactor for direct conversion of $UF_6$, such as described in U.S. Pat. No. 4,397,824.

It is, moreover, current practice to recycle waste from manufacture of the pellets, such as the oxidized grinding muds, the rejected pellets, the splinters and residues of powders in the form of $U_3O_8$ (French 2,001,113). These oxidized powders, while they slightly improve the strength of the green pellets if mixed with $UO_2$ before compacting and sintering, have a very unfavorable effect on the density and texture of the sintered pellets, for the $U_3O_8$ is in the form of dense and coarse grains. The percentage of recycled $U_3O_8$ in the green pellets is generally limited to 12% wt. at most.

It has further been suggested to mix $UO_2$ obtained by a wet process with an amount of $U_3O_8$ prepared for that purpose and whose function is to generate pores which collect fission gases in the sintered pellets (French No. 1,412,878).

SUMMARY OF THE INVENTION

It is an object of the invention to provide a manufacturing method which appreciably increases the strength of the green pellets without having an unfavorable effect on the properties of the sintered pellets.

With that purpose in mind, there is provided a method in which fine powder of uranium oxide $UO_2$ obtained by dry conversion is mixed with a proportion less than 40% by weight of uranium oxide powder substantially in the state of reactive $U_3O_8$ and having a grain size less than 350 microns. The total content of $U_3O_8$ in the mixture is preferably higher than 5%, typically from 15 to 25% wt.

The fine powder typically consists of elementary particles whose size is in the micron and sub-micron range, agglomerated into grains which pass across a 350 μm sieve. The fine powder representing 60% wt. at least of the mixture may include up to 10% wt. of an oxide of at least another element, such as Pu, Th and Gd.

The $U_3O_8$ powder is advantageously obtained by oxidation in air of $UO_2$ at a temperature lesser than 800° C. It must be continued until the O/U ratio corresponds substantially to the stoechiometry of the $U_3O_8$ oxide. To avoid sintering of the $U_3O_8$ powder and obtaining a good desaggregation of this $U_3O_8$ during subsequent mixing with the $UO_2$ powder, the oxidation is preferably carried out at a temperature between 250° C. and 350° C.

When so prepared, $U_3O_8$ has no pore forming action comparable to that of the $U_3O_8$ used in the process according to French No. 1,412,878.

The improvement in the strength of the green pellets increases with the content of oxidized powder. In practice, it is desirable to use a $U_3O_8$ content of at least 5% by weight. Thus the rejects and the faults caused by handling are reduced and the manufacturing yield is increased.

The method of the invention is applicable not only to the manufacture of uranium oxide pellets but also to that of combined oxide $UO_2$ base pellets, the best known of which are of $UO_2$—$PuO_2$, $UO_2$—$ThO_2$, $UO_2$—$Gd_2O_3$ types. Recycled $UO_3$ may also be incorporated in an amount not exceeding 10% wt.

In all cases, it is necessary to achieve intimate mixing of the powders before compacting to obtain pellets. This mixing may particularly be achieved:

from $UO_2$ and $U_3O_8$ powders crushed together in a hammer crusher, from $UO_2$ and $U_3O_8$ powders mixed in an arm mixer and equipped with a disaggglomeration turbine.

Before mixing, the powders may be disagglomerated by crushing and/or sifting, the desired result being the absence of $U_3O_8$ agglomerates.

In all cases, the mixing may be carried out in industrial equipment so as to obtain large homogeneous batches, which may exceed two tons of powder when the enrichment is sufficiently low for there to be no problem of criticality.

The invention also provides a complete method for manufacturing uranium dioxide based pellets in which green pellets are prepared by the above described steps, so as to obtain pellets formed by an intimate mixture of $UO_2$ and $U_3O_8$ without isolated $U_3O_8$ agglomerates.

Then the green pellets are sintered at a temperature allowing consolidation to be obtained, usually from 1500° to 1800° C., when the sintering takes place in a reducing atmosphere, from 1200° to 1350° C. when the sintering takes place in a slightly oxidizing atmosphere.

Different embodiments of the invention will now be given, it being understood that they are in no wise limitative.

EXAMPLE 1

The starting oxide, obtained by a dry process in a furnace of the kind described in U.S. Pat. No. 4,397,824 is a $UO_2$ powder. The powder obtained is separated into two portions. One of the portions, which represents 19.1% by weight of the total, is oxidized by passing in boats through a furnace at 330° C. through which air flows. The stay time in the furnace is 3 hours.

The remaining $UO_2$ powder and the $U_3O_8$ powder thus obtained are calibrated by passing through a rotary sifter, of turbo-calibrator type. The powders obtained are mixed in a 5000 liter "NAUTAMIX" mixer. The mesh size of the sifter may range from 200 to 350 microns.

The homogenized mixture is granulated by precompression, then crushed into grains of about 800 microns, using a conventional technique. The granulates are then compressed into pellets of a diameter of 10 mm and a height of 17 mm.

A comparison between the green pellets thus obtained, without addition of binder, and pellets manufactured from $UO_2$ coming directly from the conversion furnace and also sifted, was carried out.

Tests have shown that the green pellets manufactured from the intimate $UO_2$—$U_3O_8$ mixture have a much higher crushing strength.

The crushing test consisted in measuring the force required to break a given pellet by compressing it between two parallel surfaces (Brazilian test). For $UO_2$ powder pellets, about 20 daN was obtained with O/U=2.04. For pellets made from a $UO_2$—$U_3O_8$ mixture, it required 67 daN for O/U=2.15.

EXAMPLE 2

Tests were carried out to determine the influence of the temperature for oxidizing the powder and the unfavorable effect of high temperature oxidation.

For that, mixtures were prepared by sifting together the same powders as those described in Example 1, but with $U_3O_8$ powders obtained by oxidation at different temperatures.

The results obtained are given in the following table 1. They show that the advantages of the method of the invention decrease if the oxidation temperature increases.

TABLE I

| % powder oxidized | oxidation t° | O/U of mixture | strength of pellets (daN) |
|---|---|---|---|
| 24.6 | 300° C. | 2.22 | 65 |
| 24.6 | 550° C. | 2.22 | 45 |
| 24.6 | 900° C. | 2.22 | 23 |

TABLE I-continued

| % powder oxidized | oxidation t° | O/U of mixture | strength of pellets (daN) |
|---|---|---|---|
| $UO_2$ powder | | 2.05 | 18 |

EXAMPLE 3

12,000 kg of $UO_2$ powder obtained by the "dry" process described in the document FR-A-2 060242 was sifted using a depression sifter having a mesh size of 104 microns. An amount of 25% of the powder to be sifted was oxidized at 350° C. for 4 hours, in air, then mixed with the non-oxidized powder in a plough share mixer having a disagglomeration turbine, for 60 minutes. The $UO_2$—$U_3O_8$ mixture obtained had an O/U ratio of about 2.22.

The powder mixture was granulated by pre-compacting, then compacting using a conventional procedure. The granulates were compressed into pellets 10 mm in diameter and 15.2 mm in height, having a green density of 6.1 g/cm³, in a rotary press. The pellets were then sintered at 700° C. for 3 hours in a hydrogen atmosphere.

The fragility of the green pellets was determined by abrasion of the pellets in a squirrel cage and by measuring the loss in weight after rotating for more than 600 revolutions. This method of measurement characterizes the fragility of the edges, determinant during handling of the green pellets.

The fragility test carried out on the green pellets prepared from the $UO_2$—$U_3O_8$ mixture revealed a loss of material of 6.5%, whereas pellets manufactured from $UO_2$ suffered a loss of 35%.

In addition, the sinterability of the mixture was improved since a density of 97.39% of the theoretical density was obtained instead of 97.19% for the $UO_2$ powder.

EXAMPLE 4

700 kg of powder formed of:
80% by weight of $UO_2$ powder obtained by a dry process, and
20% of powder obtained by oxidation at 330° C. for 4 hours of $UO_2$ powder obtained by a dry process, were mixed for 60 minutes in a twin screw orbital mixer having a disagglomeration turbine.

These powders had been previously sifted using a depression sifter with a mesh of 150 microns.

The mixture was granulated by precompacting and crushing. The granulates were compressed into pellets with different rates of compression, in a die of 9.90 mm in diameter so as to produce green pieces 16 mm in height.

The pellets were then sintered in a continuous furnace, being kept at the sintering temperature of 1760° C. for 3.5 hours.

The same compacting and sintering tests were carried out with the $UO_2$ powder. The results of the comparative tests are given in the following table 2.

TABLE 2

| | With the $UO_2$ powder | | |
|---|---|---|---|
| Compacting pressure (T) | Density (g/cm3) | Fragility of the edges (%) | Density (% TD) |
| 2.5 | 5.77 | 25.4 | 97.42 |
| 3.5 | 6.02 | 19.1 | 97.63 |
| 4.5 | 6.29 | 20.0 | 97.81 |

TABLE 2-continued

| 5.5 | 6.44 | 15.5 | 97.94 |
|---|---|---|---|
| With the $UO_2$—$U_3O_8$ powder | | | |
| Compacting pressure (T) | Density (g/cm3) | Fragility of the edges (%) | Density (% TD) |
| 2.5 | 5.60 | 11.05 | 97.31 |
| 3.5 | 5.90 | 10.0 | 97.49 |
| 4.5 | 6.11 | 8.3 | 97.75 |
| 5.5 | 6.29 | 6.1 | 97.90 |

It can be seen that the green pellets made from the $UO_2$—$U_3O_8$ mixture are appreciably stronger. In addition, the sinterability is slightly improved. Depending on the intrinsic characteristics of the oxides to be formed into pellets and of the pellet forming installation, optimum strength for green pellets can be obtained by adjusting the $U_3O_8$ content and the compacting pressure.

Similar tests were made on pellets including, in addition to uranium oxide, an absorbant material oxide (gadolinium). These tests showed that the same favorable results are obtained from the dual point of view of reduction of green fragility and the absence of degradation of the sintered product.

I claim:

1. A method of manufacturing sintered pellets, comprising the steps of: preparing fine $UO_2$ powder by dry conversion of $UF_6$; manufacturing reactive $U_3O_8$ powder having a grain size less than 350 μm by oxidation in air of part of the $UO_2$ as obtained by dry conversion, at a temperature less than 800° C.; preparing an intimate mixture of said $UO_2$ powder and of a proportion of from 5% to 25% by weight of said reactive $U_3O_8$ powder; cold compressing the mixture into green pellets; and sintering said green pellets.

2. Method according to claim 1, wherein the oxidation temperature is between 250° C. and 350° C.

3. Method according to claim 2, wherein the mixture additionally contains one at least of the elements Pu, Th and Gd in dioxide form and Gd as $Gd_2O_3$.

4. Method according to claim 1, wherein sintering is carried out at a temperature of from 1200° C. to 1300° C. in a slightly oxidizing atmosphere.

5. Method according to claim 1, wherein said intimate mixture is granulated by precompression and crushing into grains prior to said cold compressing of said mixture into pellets.

6. A method of manufacturing sintered nuclear fuel pellets, comprising the steps of: preparing fine $UO_2$ by dry conversion of $UF_6$; manufacturing reactive $U_3O_8$ powder having a grain size less than 350 μm by oxidation in air of part of said $UO_2$ powder at a temperature between 250° C. and 350° C.; preparing an intimate mixture of said $UO_2$ powder and a proportion of from 5 to 25% by weight of said reactive $U_3O_8$ powder; cold compressing the mixture into green pellets; and sintering said green pellets at a temperature between 1500° and 1800° C. in a reducing atmosphere.

* * * * *

UNITED STATES PATENT AND TRADEMARK OFFICE
CERTIFICATE OF CORRECTION

PATENT NO. : 4,889,663
DATED      : DECEMBER 26, 1989
INVENTOR(S): Michel PIRSOUL It is certified that error appears in the above-identified patent and that said Letters Patent is hereby corrected as shown below:

Title page, the name of the inventor should read:

--Michel PIRSOUL--.

Signed and Sealed this

Fifth Day of November, 1991

Attest:

HARRY F. MANBECK, JR.

Attesting Officer      Commissioner of Patents and Trademarks